Dec. 5, 1972   D. M. ROSVOLD   3,705,072
UNDERPACKING FOR PRINTING WITH DIMENSIONALLY STABLE
PLASTIC CORE HAVING ELASTOMERIC AND PRESSURE
SENSITIVE OUTER LAYERS
Filed May 4, 1970
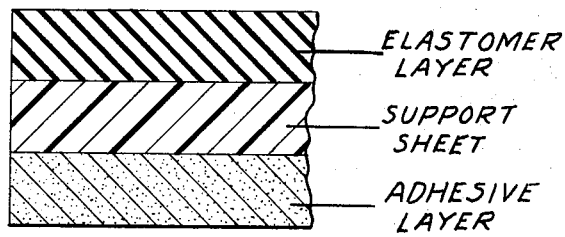

United States Patent Office 3,705,072
Patented Dec. 5, 1972

3,705,072
UNDERPACKING FOR PRINTING WITH DIMEN-
SIONALLY STABLE PLASTIC CORE HAVING
ELASTOMERIC AND PRESSURE SENSITIVE
OUTER LAYERS
Donald M. Rosvold, South St. Paul, Minn., assignor to
Minnesota Mining and Manufacturing Company, St.
Paul, Minn.
Filed May 4, 1970, Ser. No. 34,601
Int. Cl. B32b 27/06, 27/32, 27/40
U.S. Cl. 161—167          2 Claims

ABSTRACT OF THE DISCLOSURE

A novel underpacking comprising a support sheet having a shear resistant layer affixed to its upper and lower faces with at least the top layer providing a low tack release surface said support sheet being selected from cellulose acetate triacetate and polyethylene terephthalate. For the working smooth elastomeric surface, polyurethane or silicone is used.

---

This invention relates to a new underpacking for printing plates.

Cylinders in large printing presses, to which printing plates are attached are generally smaller in diameter than cylinders to which printing blankets are attached. This "undercutting," which can be as much as 40 mils, allows for the use of a variety of plate thicknesses. It also permits the printer to choose, to some extent, the effective diameter of the plate cylinder. (The desired diameter is dependent upon the diameter of the blanket cylinder, the particular press used, the pressure of cylinder contact, and several other factors familiar to the printer.)

The effective diameter is the total of cylinder diameter, plate thickness and amount of underpacking. Underpacking is roll stock available in several designated thicknesses which is placed between the cylinder and the plate to allow the printer to achieve the desired effective cylinder diameter.

Underpacking has traditionally been made of heavy duty paper which has been treated to increase its water and solvent resistance. While this paper performs its traditional function of increasing the effective diameter of the plate cylinder, it has several drawbacks. Firstly, while more solvent and water resistant than untreated paper, it is still susceptible to attack by these media. Secondly, paper has a relatively low tensile strength and may become torn during use. Thirdly, the sheets can wrinkle during use thereby providing an uneven plate surface with the resulting detraction of the image and damage to the printing blanket. Fourthly, these treated papers, e.g., kraft paper, are slick surfaced and allow the plate to shift during use as a result of the subjection of the plate to shear forces inherent in the printing process.

During the printing process the plate cylinder is rapidly revolving. This action exerts tremendous amounts of centrifugal force on the plate causing it to bow outwardly from the cylinder in the areas where it is neither clamped nor in contact with the inking rolls or blanket cylinder. Because the cylinders are moving the effect on the plate is wave-like in nature with a pitching and heaving of the plate along its circumference. Where the plate bows from the surface of the underpacking, air enters and serves to increase the pressure on the clamping means. Air also acts as a lubricant for the underpacking thereby increasing the slippage tendency mentioned earlier. Furthermore, water and ink can be drawn into the area between the plate and the underpacking. If water and ink are drawn in, their presence will magnify the shear forces applied to the plate by the inking rolls and printing blanket and also result in the need for a massive cleanup of the plate cylinder.

The underpacking of this invention comprises a thin, flexible, uniform, strong, essentially smooth, dimensionally stable support sheet having shear resistant layers on its top and bottom faces. This underpacking provides a surface which is in close conformity with the backside of the plate during the press run and forms a shear resistant juncture where the surface of the underpacking contacts the underside of the plate. (In some instances, especially in the smaller presses, some or all plate clamps may be eliminated when this underpacking is used.)

The underpacking of the invention is illustrated in the accompanying drawing in which the single figure shows a laminate in cross-section comprised of an intermediate support sheet coated on each of its major surfaces with an elastomer layer and an adhesive layer, respectively.

The support sheet part of the underpacking composite must be sufficiently flexible to conform to the configuration of the printing cylinder. It must be strong to resist the tremendous forces applied during printing and dimensionally stable to resist the deformability of the topmost layer which is elastomeric in nature. Uniformity and smoothness are important to help insure that when the top layer is applied to the sheet, the surface of the layer is also smooth and uniform. Uniformity, smoothness and strength become particularly critical when the sheets of underpacking are thin. Underpacking comes in a variety of thicknesses which, with the underpacking of this invention as well as the conventional underpacking, can be stacked to achieve the precise thickness desired. For stacking as well as for presses with cylinders having very little or no undercutting, underpacking is made in sheets only two or three mils thick. For the product of this invention, this means that the support sheet can be no more than about one mil thick for these thinner composites. Any irregularity in the surface of the support sheet such as that caused by woven strands or fibrous webs would produce an accompanying irregularity in the top layer with the disadvantages indicated subsequently.

Materials for the thin support sheets which particularly satisfy the above criteria are films of polyethylene terephthalate, cellulose acetate or cellulose triacetate, although other materials such as polypropylene, polyimide, or polystyrene films, and metal foil, can also be used. A large variety of other sheet materials can also be used especially for the thicker underpacking where small surface irregularities in the support sheet may be masked or minimized by a thicker top layer.

The top, i.e., the outer surface of the support sheet as placed on the cylinder has a smooth-surfaced elastomeric layer adhered thereto. The elastomer in conjunction with the support sheet is designed to be of relatively low resilience. The layer must also not be readily soluble in water and hydrocarbon solvents so that if during the printing process water and the oleophilic printing ink migrates inward from the outside edges of the plate, no distortion in the uniformity of the underpacking will occur. These materials, for the same reason, should also be nonporous to protect the printing cylinder and allow for easy cleanup.

While chemically related material has been used in the past in the printing industry, see U.S. Pat. Nos. 3,377,949, issued Apr. 16, 1968 and 3,147,698, issued Sept. 8, 1964, there is no identification of the physical parameters necessary for providing the thin, low tack, high shear resistant surface necessary for the underpacking of this invention. These surface phenomena are especially dependent upon the uniformity in thickness and surface as well as the elastomeric properties of the layer. When fibrous material, such as that disclosed in the above-mentioned patents is used as the support sheet, the surface of the elastomer is not of uniform thickness and relatively rough due to the thinness of the elastomeric layer. This irregularity substantially decreases the shear resistance at the juncture of the elastomeric material and the plate backing.

These elastomers must also have a low tack release value to allow for the easy removal of the plate after printing is finished. Tack can be measured in terms of the force required to separate two materials (in this case a stainless steel proble and the elastomer) at their interface without suffering cohesive failure in one of the components. The tackiness displayed by a material depends on the temperature, rate of the probe separation from the sample, the probe-sample contact time, probe pressure, and size and the physical and chemical properties of the probe and the sample.

The tack release properties aer measured in gms./cm.$^2$ and expressed as "tack stress." The "tack stress" values were determined at 23° C. by contacting the sample with a polished stainless steel surfaced probe and measuring the force needed to achieve separation. The probe had a flat contact surface area of 0.019 cm.$^2$. The force exterted on the elastomer by the probe was 100 gms./cm.$^2$, the contact time 50 seconds, and the probe removal rate was 0.1 cm./sec. It was found that printing plates could be easily removed from the elastomeric surface of the underpacking when the tack stress value was not greater than about 2100 gms./cm.$^2$.

Elastomeric coatings useful in this invention must also have the ability to form high shear junctures with the undersurface of the printing plates. Overlap shear adhesion values are used as the indicator for the ability to form such junctures. The elastomers must have an overlap shear adhesion value greater than 3 lbs./¼ sq. in. as measured at 23° C. and 50% relative humidity according to the procedure of the ASTM D1002-64 test as run on the Instrom tester and modified to the extent that the ram speed was 2 in./min. The test was run on ½ in. width polyethylene terephthalate backed elastomers with ½ in. overlap with 5 mil polyethylene terephthalate film used as the test surface.

The underpacking must be resistant to shear also so that it does not slip on the cylinder. To accomplish this shear resistance, the bottom face of the support sheet is coated with either a pressure sensitive adhesive or an elastomer used for the top face of the support sheet. Pressure sensitive adhesives have much higher tack and, therefore, provide the preferable surface for underpacking used in smaller presses having automatic ejection clamps. These clamps automatically remove and replace the plate when a run is complete, therefore, there is no need to remove the underpacking after each run. For other smaller presses where plates of a variety of thicknesses are constantly interchanged for smaller printing runs, an elastomeric undersurface is preferred so that the underpacking may be readily changed. Although pressure sensitive adhesive-backed underpacking can be peeled off and the adhesive residue removed by washing with non-polar organic solvents, such removal is relatively time consuming and messy and, therefore, pressure sensitive adhesive-backed sheets should only be used where the underpacking atachment is intended to be used for a plurality of runs for plates of the same thickness.

There are several elastomeric materials which can be used as the upper surface of the underpacking of this invention. Examples of such materials are polyurethane and silicone elastomers and certain solvent resistant synthetic rubbers, such as the acrylonitrile-butadiene elastomer sold by B. F. Goodrich under the trade name "Hycar 1072."

Of the above class polyurethane elastomers are particularly preferred because of durability, cost and solvent resistance. The elastomeric nature of the polyurethanes useful in practicing this invention is related to the frequency of cross linking and the urethane linkage density. It has been found that when an average of one urethane linkage for every 600 atomic weight units of polyol is used an average of one cross linking site for each 3400 molecular weight produces a surface layer with good solvent resistance and good elastomeric properties. This combination produces a Shore A value of about 45. It should be noted that cross linking and urethane linkage density are interdependent, i.e., both can be varied to produce polyurethanes with equivalent elastomeric properties and solvent resistance to the one characterized above. As is well known in the art, the relationship of cross linking to molecular weight is reflected by hardness values and dependent upon the molecular weight, the equivalent weight, and the functionality of both the alcohol and polyisocyanate components. While it is possible to use average urethane linkage densities as low as one for every 750 atomic weight units and average cross linking sites as low as one for every 20,000 molecular weight units, these materials are somewhat softer, i.e., a Shore A hardness of 20, and less hydrocarbon solvent resistant than the urethane elastomers with the preferred range described above. Urethane elastomers with a Shore A hardness value of as much as 70 can also be used, but while these comparatively highly cross linked urethanes are more solvent resistant than the preferred urethane, they are also less elastomeric and, therefore, will form a juncture with the back of the plate with lower shear resistance than the juncture formed by the preferred elastomer.

The preferred resins for forming the polyurethane layer are polyoxyalkylene ether, polyol based polyurethanes, i.e., the reaction products of such polyols with organic polyisocyanates although polyester based polyurethanes can also be used.

Various aromatic, aliphatic, cycloaliphatic or heterocyclic polyisocyanates or mixtures thereof can be used, although toluene diisocyanate is preferred for economic reasons.

Silicone elastomers are also useful in forming the elastomeric surface of this invention. These elastomers have the central repeating unit

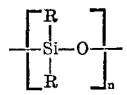

in which $n$ is an integer greater than about 5000 and R is a monovalent alkyl or aryl group or a halogenated alkyl or aryl group, although small amounts of vinyl, phenyl or halogenated phenyl may be present amongst the total amount of R groups, the major proportion of R groups are usually methyl. The preferred group of silicone elastomers can be characterized generally as the very sparsely cross-linked (cured) dimethyl polysiloxanes of high molecular weight, e.g., 400,000–800,000 average molecular weight. The sparsity of cross-linking is indicated by R/Si ratios very close to 2, generally above 1.95, or even above 1.99, and generally below 2.1 or even below 2.01, there usually being 200–500 dimethyl units between cross link sites.

While an internal R may become a cross-linking site, depending somewhat on the curing mechanism, cross-linking more frequently involves the end groups which may be

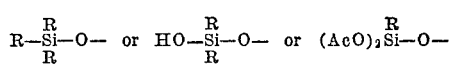

where "R" has the same meaning as above, and where Ac is a saturated aliphatic monoacyl radical.

Small amounts of thoroughly dispersed, finely divided, particulate material of a few microns in size may be added to any of the above-mentioned elastomers to add strength. However, if the particles are too large or not finely dispersed, they can produce a roughened surface which, as mentioned previously, interferes with the formation of the shear resistant juncture.

It should be noted that the process of mounting a material to a substrate, as illustrated by the use of underpacking described above, is obviously much broader than the attachment of printing plates to printing cylinders. The same materials may be used as a mounting means for a variety of substrates, such as for mounting X-ray or other photographic negatives on viewing plates, (transparent elastomers and support sheets are preferred for such uses and are readily available). Mounting of pictures or posters to walls, windows and several other uses are obvious once the products of this invention are provided.

For these uses and for printing presses which are constructed so as to minimize the exposure of the underpacking to solvent and water, less solvent resistant materials can be used, such as polyethylene-propylene elastomers, e.g., Du Point Nordell 1145, chlorosulphonated polyethylene elastomers, e.g., Du Pont Hypalon 40 and solution grade polyurethanes such as Estane 5702 sold by B. F. Goodrich Co.

Examples of the product of our invention follow. These examples are illustrative rather than definitive of the ambit of this invention and should be so construed.

All of the following examples used a support sheet of two mil polyethylene terephthalate except as otherwise noted. This film was corona discharge treated on both sides and squeeze roll coated with 100 gms. of water solution containing 0.5 gms. of p-diazodiphenylamine-formaldehyde resin as described in Jewett and Case, U.S. Pat. No. 2,714,066 to prime the film surface and dried in a convection oven at 140° F. The elastomer in each instance was then knife coated to the desired thickness and the coated sheet was heated at 250° F. for 10 minutes.

Examples 1–6 were designed to produce an elastomeric surface for testing in Example 7 and do not have a shear resistant surface on both sides.

EXAMPLE 1

This is an example of the presently preferred elastomer. The following ingredients were uniformly dispersed in a ball mill.

| Ingredient: | Parts by weight |
|---|---|
| Polyoxypropylene glycol (eq. wt. 1000) | 100 |
| Toluene | 200 |
| Filler (fire dried fumed silica) | 22 |
| Phenylmercuric acetate (catalyst) | 0.1 |

The mixture was removed from the ball mill and just prior to coating, 14 parts by weight of the adduct of toluene diisocyanate and trimethylol propane propylene oxide having an equivalent weight of 136 was mixed with it in an impeller mixer. The composition of the adduct in parts by weight was as follows:

| Ingredient: | Parts by weight |
|---|---|
| Toluene diisocyanate | 86.7 |
| Trimethylol propane propylene oxide reaction product (equivalent wt. 140) | 6 |
| Trimethanol propane | 7.3 |

The mixture was then coated to dry thickness of 1.3 mil and following heating allowed to cure for 7 days at 23° C.

EXAMPLE 2

Example 1 was repeated in all particulars except that no filler was used and the coating weight was 0.3 mil. The cured product of this example and Example 1 was a polyurethane elastomer having an average of about 1 cross link site for every 3400 g. molecular weight and an average urethane linkage density of $1/600$ g. molecular weight.

EXAMPLE 3

Example 1 was repeated except 16 gms. of silica filler was used.

EXAMPLE 4

This example illustrates another preferred elastomer. For this example 20 parts by weight of a member of the preferred class of silicone elastomers was dissolved in heptane and coated to a thickness of 0.5 mil and dried and cured. A commercially available example of this class of preferred elastomer is the one-step, room-temperature, vulcanizing silicone-based, caulking compounds.

EXAMPLE 5

The following mixture was prepared and milled on a two-roll rubber mill till uniform:

| Ingredient: | Parts by weight |
|---|---|
| Acrylonitrile - butadiene elastomer ("Hycar 1072") | 100 |
| Filler (Calcined clay) | 40 |
| Pigment (stearic acid treated zinc oxide ("Goodrite 3300×2") | 10 |
| Pigment (white paste containing 70% rutile titanium dioxide in vinyl plasticizer ("Claremont D 16") | 30 |

Forty parts by weight of the solid mixture was then chopped into small pieces, dissolved in methyl ethyl ketone and coated to achieve a dry coating thickness of 0.5 mil.

EXAMPLE 6

A cloudy acrylic emulsion used as a coating and sold as "Rhoplex K14" by Rohm and Haas was coated on the support sheet to achieve a transparent dry coating thickness of 1 mil, dried and cured. This coating was soluble in methyl ethyl ketone but insoluble in water and aliphatic hydrocarbon solvents.

EXAMPLE 7

The product of the above examples were subjected to overlap shear adhesion tack and tests as described above. An average value attained from 3 runs is indicated in the table below.

| Type | | Shear adhesion (lb./¼ sq. in.) | Tack (gm./cm.²) |
|---|---|---|---|
| Example No.: | | | |
| 1 | Polyurethane | 13.6 | 1,578 |
| 2 | do | 12.5 | 1,315 |
| 3 | do | 4.5 | 1,053 |
| 4 | Silicone | 8.9 | 1,053 |
| 5 | Acrylonitrile-butadiene | 26.6 | 1,315 |
| 6 | Acrylic emulsion | 9.5 | 2,105 |
| Underside 1 | Iso-octyl acrylate acrylic acid adhesive (2 mils). | 23.3 | 4,210 |
| Underside 2 | As above but 0.6 mil coating thickness. | 19.4 | 4,210 |

The two samples labeled Underside 1 and Underside 2 are comparative examples of pressure sensitive adhesive coatings presently preferred for use in adhering the underside of the underpacking to the cylinder. The data indicates that removal of the underpacking from the cylinder by pulling it off will be difficult but its high shear adhesion values indicate that underpacking adhered to the cylinder surface by this adhesive will not slip during printing.

It should be noted that the shear adhesion values of the preferred elastomers are somewhat lower than the pressure sensitive adhesives. They are high enough to produce an excellent shear resistant juncture with the underside of the printing plate. The tack values for the elastomers are such that plates can be rapidly and easily peeled from all of them.

EXAMPLE 8

This example illustrates a presently preferred embodiment of this invention. First, underpacking was prepared using a 2 mil polyethylene terephthalate support sheet which had been coated to a dry thickness of 0.5 mil with the polyurethane elastomer of Example 1 according to the method described therein. Pressure sensitive adhesive described in Example 7 was coated to a dry thickness of 2 mil on the opposite side of the support sheet. The underpacking was adhered to the printing cylinder of a small press which was undercut to the thickness of the plate used, the plate was adhered to the underpacking, clamped in place and the run commenced. A complete run of 2000 copies produced no evidence of plate slippage while without this underpacking the plate flew out of the press after 300 copies.

EXAMPLE 9

A comparison was run on the press used in Example 8. A plate was placed directly on the cylinder, clamped in, and the press was started. After 300 copies, the plate slipped out of the press. A second run was made using a 2 mil thick polyethylene terephthalate support sheet coated to a thickness of 2 mil on the underside with the adhesive described in Example 7 and on the side facing the plate with the elastomer of Example 4 following the process described therein. The total thickness of the underpacking was 4.5 mils. The total run of 4000 copies was completed with no plate slippage evident.

EXAMPLE 10

Example 8 was repeated on a second press to test an underpacking coated on both sides with equal coating thickness of the polyurethane elastomer for a total thickness of 4.5 mils. A run without underpacking produced 100 copies before slipping from the clamps, while a press run of 2000 copies using the underpacking was completed without any slippage evident.

What is claimed is:

1. A laminate especially useful as an underpacking for maintaining printing plates in substantially uniformly spaced relationship about printing rollers, said laminate comprising in combination:
   a thin, uniform, non-porous, strong, substantially smooth-surfaced, dimensionally stable, flexible, continuous, solid support sheet formed of a synthetic polymeric resin selected from the group consisting of polyethylene terephthalate, cellulose acetate, and cellulose triacetate;
   a thin, shear-resistant solvent-soluble pressure sensitive adhesive layer having one major surface adherently bonded to and coextensive with one major surface of said support and a smooth opposite major surface for contacting a printing roller; and
   a thin, shear-resistant, substantially uniform, non-porous, elastomeric layer having one major surface adherently bonded to and coextensive with the opposite major surface of said support sheet and a smooth opposite surface for supporting a printing plate, said elastomer being water and aliphatic solvent-insoluble and characterized by having a Shore A hardness of 20–70, a tack-release value of not greater than about 2100 gm./cm.$^2$, and a shear value of not less than about 3 lbs./¼ sq. in., and said elastomer being selected from the group consisting of polyurethane and silicone elastomers, said laminate having a total thickness of at least two mils.

2. The laminate of claim 1 wherein said pressure sensitive adhesive is an iso-octyl acrylate:acrylic acid copolymer.

References Cited

UNITED STATES PATENTS

| | | | |
|---|---|---|---|
| 2,673,826 | 3/1954 | Ness | 161—401 |
| 3,053,718 | 9/1962 | Hechtman et al. | 161—401 |
| 3,147,698 | 9/1964 | Ross | 161—401 |
| 3,493,420 | 2/1970 | Brintzinger et al. | 161—401 |
| 3,085,903 | 4/1963 | Bemmels et al. | 161—190 |

FOREIGN PATENTS

| | | | |
|---|---|---|---|
| 662,449 | 4/1963 | Canada | 161—190 |

ROBERT F. BURNETT, Primary Examiner

C. B. COSBY, Assistant Examiner

U.S. Cl. X.R.

29—130, 132; 161—190, 206, 209, 231, 249, 256